(12) United States Patent
Wang

(10) Patent No.: US 8,478,475 B2
(45) Date of Patent: Jul. 2, 2013

(54) VEHICLE-MOUNTED ELECTRONIC APPLIANCE

(75) Inventor: Hongying Wang, Tottori (JP)

(73) Assignee: Sanyo Electric Co., Ltd., Tottori (JP)

( * ) Notice: Subject to any disclaimer, the term of this patent is extended or adjusted under 35 U.S.C. 154(b) by 314 days.

(21) Appl. No.: 12/682,023

(22) PCT Filed: Oct. 24, 2008

(86) PCT No.: PCT/JP2008/069318
§ 371 (c)(1),
(2), (4) Date: Apr. 7, 2010

(87) PCT Pub. No.: WO2009/057521
PCT Pub. Date: May 7, 2009

(65) Prior Publication Data
US 2010/0211252 A1    Aug. 19, 2010

(30) Foreign Application Priority Data

Oct. 31, 2007 (JP) ................... 2007-283500

(51) Int. Cl.
*G01M 17/00* (2006.01)
*B60Q 1/00* (2006.01)
*B60R 25/10* (2006.01)

(52) U.S. Cl.
USPC .............. 701/29.1; 340/425.5; 340/426.1; 340/428; 340/426.11; 340/426.22

(58) Field of Classification Search
USPC ............ 701/29, 400; 340/425.5, 426.1, 428, 340/426.11, 426.22, 426.3, 426.34, 435, 340/438, 426
See application file for complete search history.

(56) References Cited

U.S. PATENT DOCUMENTS

| 4,906,969 | A | * | 3/1990 | Ghazarian | ..................... 342/426 |
| 7,471,192 | B2 | * | 12/2008 | Hara et al. | ..................... 340/435 |
| 2002/0032506 | A1 | * | 3/2002 | Tokitsu et al. | ..................... 701/29 |

FOREIGN PATENT DOCUMENTS

| JP | 2003-081061 | 3/2003 |
| JP | 2003-132441 | 5/2003 |
| JP | 2004-058802 | 2/2004 |
| JP | 3565125 | 9/2004 |
| JP | 2004-355241 | 12/2004 |
| KR | 20-1998-047768 | 9/1998 |

OTHER PUBLICATIONS

Korean Office Action issued in Korean Patent Application No. KR 10-2010-7009615 dated Oct. 25, 2011.

* cited by examiner

*Primary Examiner* — Joseph Burgess
(74) *Attorney, Agent, or Firm* — McDermott Will & Emery LLP

(57) ABSTRACT

A vehicle-mounted electronic appliance has a vehicle state detection portion which detects a vehicle being parked, a sound indication portion, and a sound indication control portion. When the vehicle state detection portion detects that the vehicle is parked, the sound indication control portion makes the sound indication portion indicate a warning to watch out for theft.

3 Claims, 8 Drawing Sheets

Fig.3

|   | 1 | 2 | 3 | 4 | 5 | 6 | 7 | 8 |
|---|---|---|---|---|---|---|---|---|
| A | 0 | 0 | 0 | 0 | 0 | 0 | 0 | 0 |
| B | 0 | 0 | 0 | 0 | 0 | 0 | 0 | 0 |
| C | 0 | 0 | 0 | 0 | 0 | 0 | 0 | 0 |
| D | 0 | 0 | 0 | 1 | 1 | 0 | 0 | 0 |
| E | 0 | 0 | 0 | 1 | 1 | 0 | 0 | 0 |
| F | 0 | 0 | 0 | 0 | 0 | 0 | 0 | 0 |
| G | 0 | 0 | 0 | 0 | 0 | 0 | 0 | 0 |

↓

| A1 | → | 0 |
| A2 | → | 0 |
| :  | → | : |
| D4 | → | 1 |
| D5 | → | 1 |
| :  | → | : |
| G6 | → | 0 |
| G7 | → | 0 |

Fig.4

| PREFECTURE | CITY | TOWN | LOT | ON(1)/OFF(0) |
|---|---|---|---|---|
| TOTTORI | TOTTORI | AAA TOWN | 1 | 1 |
| | | | 2 | 1 |
| | | | 3 | 0 |
| | | AAB TOWN | 1 | 0 |
| | | | 2 | 0 |
| | | | 3 | 0 |
| | | AAC TOWN | 1 | 0 |
| | | | 2 | 0 |
| | | | 3 | 0 |
| | KURAYOSHI | BBA TOWN | 1 | 1 |
| | | | 2 | 1 |
| | | | 3 | 1 |
| | | BBB TOWN | 1 | 1 |
| | | | 2 | 0 |
| | | | 3 | 0 |
| | | BBC TOWN | 1 | 0 |
| | | | 2 | 0 |
| | | | 3 | 0 |

VEHICLE-MOUNTED ELECTRONIC APPLIANCE

RELATED APPLICATIONS

This application is the U.S. National Phase under 35 U.S.C. §371 of International Application No. PCT/JP2008/069318, filed on Oct. 24, 2008, which in turn claims the benefit of Japanese Application No. 2007-283500, filed on Oct. 31, 2007, the disclosures of which Applications are incorporated by reference herein.

TECHNICAL FIELD

The present invention relates to a vehicle-mounted electronic appliance that is removably mounted on a vehicle. More particularly, the present invention relates to a vehicle-mounted electronic appliance that warns a user of the danger of theft when a vehicle is parked in an area where vehicle-mounted electronic appliances are prone to theft, based on the vehicle's current location and previously-stored or user-set data on areas where vehicle-mounted electronic appliances are prone to theft.

BACKGROUND ART

Nowadays, various kinds of electronic appliances—such as navigation devices, music players, DVD players, television receivers ready for analog and digital broadcasts—are made compact and are offered as portable or vehicle-mountable devices.

Some of these vehicle-mounted electronic appliances, for example navigation devices, are, when used, fitted to the dashboard of a vehicle.

Today, there are even offered electronic appliances that are both vehicle-mountable and portable by being furnished with a built-in power supply or a means of connection to an AC (alternating-current) power supply so that, when removed from a vehicle, they can be carried around for use as portable appliances or at home. These vehicle-mounted electronic appliances are fairly easy to remove from the dashboard, and are therefore prone to theft (burglary).

Various proposals have been made for dealing with situations where such vehicle-mounted electronic appliances face the danger of being stolen.

For example, Patent Document 1 (JP-A-2004-355241) listed below discloses a vehicle communication ECU (electric or electronic control unit) and a method of monitoring it against theft.

The technology disclosed in Patent Document 1 is directed to a device that permits a vehicle-mounted appliance to communicate with the outside via a wireless device; a sensor is provided which monitors the fitting state of the vehicle-mounted appliance to a vehicle, and the sensor watches out for abnormal removal as in theft. Based on the monitoring output from the sensor, the wireless device notifies a control center of the theft. Simultaneously, the wireless device is locked so as to become unusable.

On the other hand, Patent Document 2 (JP-B-3565125) listed below discloses a device that warns of an accident-prone road section when there is one within a predetermined range in the direction in which the vehicle of interest is traveling.

According to the technology disclosed in Patent Document 2, road sections that were prone to accidents in the past are previously stored in the form of accident-prone road section information in which accident-prone road sections are, in a form organized one by one, represented by the latitudes and longitudes of their end points and of midway points such as crossroads; it is checked whether or not at least two of the end and midway points of an accident-prone road section are included in a predetermined range in the direction in which the vehicle of interest is traveling, and if it is judged that at least two such points are included, a warning is given of approach to the accident-prone road section.

Patent Document 1: JP-A-2004-355241 (paragraphs [0018]-[0029], and [0029]-[0037]).

Patent Document 2: JP-B-3565125 (paragraphs [0012], [0014], and [0016]-[0025]).

DISCLOSURE OF THE INVENTION

Problems to be Solved by the Invention

With the vehicle-mounted electronic appliance disclosed in Patent Document 1 mentioned above, however, a sensor for monitoring the fitting state of the vehicle-mounted electronic appliance to a vehicle is provided, the sensor watches out for abnormal removal in theft, and the monitoring output from the sensor is delivered via a wireless device to an external control center—this leads to the following problems: to detect the theft of the vehicle-mounted electronic appliance, it is necessary to provide the sensor separately from the vehicle-mounted electronic appliance, resulting in increased cost; moreover, since it is necessary to communicate with the external control center, if, for example, a communication failure occurs, it is not possible to detect theft. Another problem is that it is possible to detect theft indeed, but it is not possible to prevent theft.

With the device disclosed in Patent Document 2 mentioned above which warns of an accident-prone road section, it is checked whether or not at least two of the end and midway points of an accident-prone road section are included in a predetermined range in the direction in which the vehicle of interest is traveling, and if it is judged that at least two such points are included, a warning is given of approach to the accident-prone road section. There is, however, no danger of theft even if a theft-prone road section is present in a predetermined range in the direction in which the vehicle of interest is traveling, so long as the vehicle simply travels across that road section. It is when the driver parks the vehicle and leaves it that theft is to be watched out for most. That is, a warning is most needed not while the vehicle is traveling but when it is parked. According to Patent Document 2, however, there is provided no means of judging whether or not the vehicle of interest is parked, hence the problem that it is not possible to give a warning when the vehicle is parked in a theft-prone area.

To overcome the problems mentioned above, it is an object of the present invention to provide, by equipping a vehicle-mounted electronic appliance with a vehicle state detecting capability for detecting a vehicle being parked and a warning capability, a vehicle-mounted electronic appliance that indicates a warning to watch out for theft on detecting a vehicle being parked, without specially requiring communication with the outside, and that thereby prevents theft.

Means for Solving the Problem

To achieve the above object, according to the invention, a vehicle-mounted electronic appliance having a vehicle state detection portion which detects a vehicle being parked, a sound indication portion, and a sound indication control portion is so configured that when the vehicle state detection portion detects that the vehicle is parked, the sound indication control portion makes the sound indication portion indicate a warning to watch out for theft.

With this configuration, a warning to watch out for theft is indicated when the vehicle is parked, without specially requiring communication with the outside, and thus the driver can take action against theft, thereby to prevent theft.

According to the invention, the vehicle-mounted electronic appliance configured as described above may further have a current location detection portion which detects a current location, a theft-prone area storage portion which stores theft-prone area data, and an area discrimination portion, and may be so configured that when the area discrimination portion detects that the current location detected by the current location detection portion is within a theft-prone area stored in the theft-prone area storage portion, and in addition the vehicle state detection portion detects that the vehicle is parked, the sound indication control portion makes the sound indication portion indicate a warning to watch out for theft.

With this configuration, when the location at which the vehicle is parked is in a theft-prone area, a warning to watch out for theft is indicated. This prevents the driver from leaving the vehicle without noticing that the vehicle is parked in a theft-prone area.

According to the invention, the vehicle-mounted electronic appliance configured as described above may further has an external power supply connection portion, an internal power supply, and a power supply control portion, may receive electric power from the external power supply via the external power supply connection portion, and may be so configured that when the area discrimination portion detects that the current location detected by the current location detection portion is within a theft-prone area stored in the theft-prone area storage portion, and in addition the vehicle state detection portion detects that the vehicle is parked, the power supply control portion switches the source of the supply of electric power from the external power supply to the internal power supply.

With this configuration, when the location at which the vehicle is parked is in a theft-prone area, and even after it is found that the vehicle is parked, the source of the supply of electric power can be switched to the internal power supply to indicate to the driver a warning to watch out for theft.

According to the invention, the vehicle-mounted electronic appliance of any of the configurations described above may be so configured that the vehicle state detection portion judges that the vehicle is parked on detecting that the ignition switch of the vehicle is turned from on to off.

With this configuration, the parking of the vehicle can be detected more accurately.

Advantages of the Invention

With a vehicle-mounted electronic appliance according to the present invention, it is possible to indicate a warning to watch out for theft on detecting that a vehicle is parked, without specially requiring communication with the outside, and thereby to prevent theft.

BRIEF DESCRIPTION OF DRAWINGS

[FIG. 3] is a diagram showing theft-prone area data.

[FIG. 4] is a diagram showing theft-prone area data.

Figure 1:
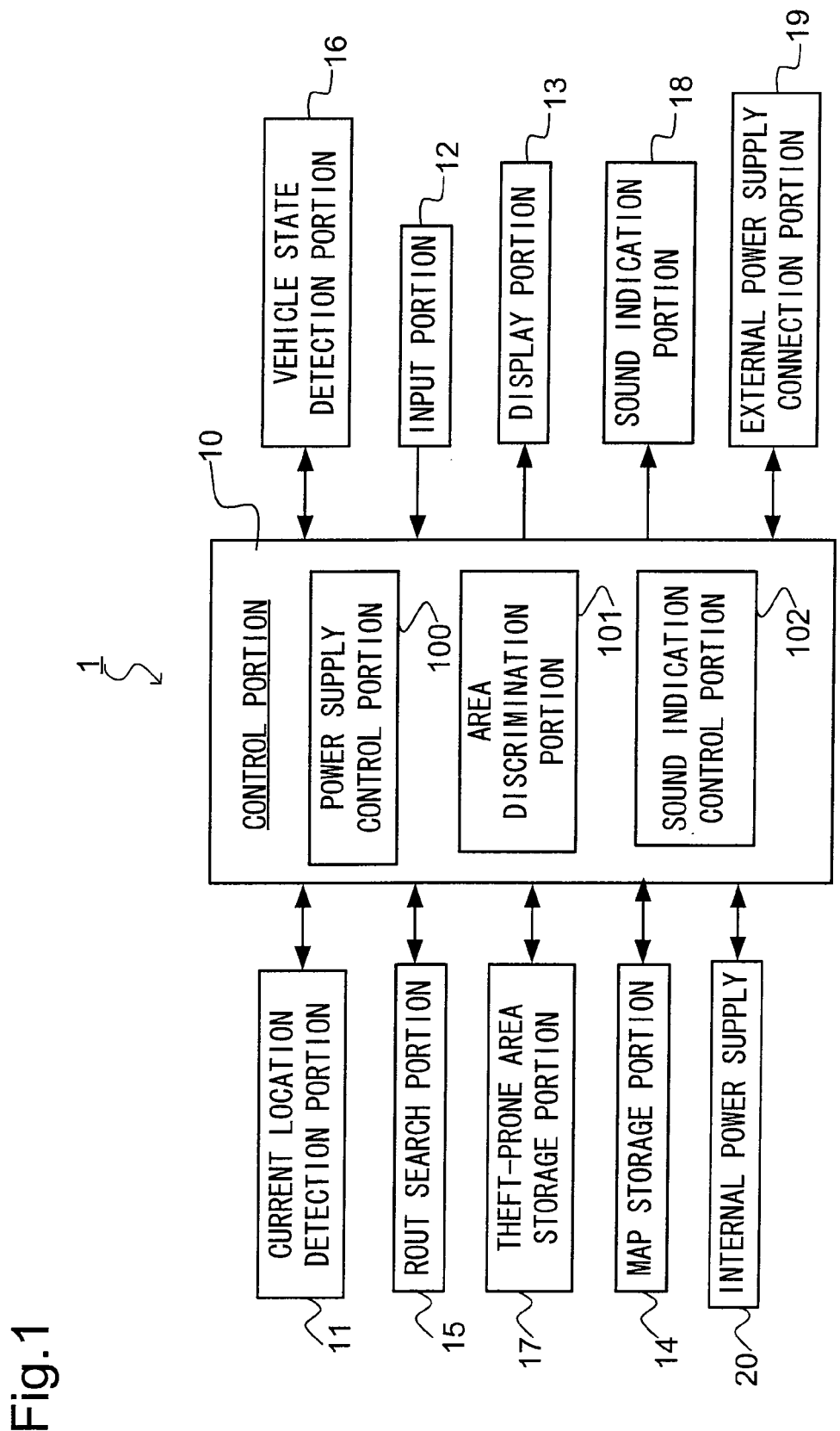
[FIG. 1] is a block diagram showing a principal part of a vehicle-mounted navigation device 1 according to the invention.

LIST OF REFERENCE SYMBOLS 1 vehicle-mounted navigation device
10 control portion
100 power supply control portion
101 area discrimination portion
102 sound indication control portion
11 current location detection portion
12 input portion
13 display portion
14 map storage portion
15 route search portion
16 vehicle state detection portion
17 theft-prone area storage portion
18 sound indication portion
19 external power supply connection portion
20 internal power supply

BEST MODE FOR CARRYING OUT THE INVENTION

Hereinafter, specific examples of the present invention will be described by way of practical examples (Examples 1 and 2) with reference to the accompanying drawings. Although the specific examples presented below deal with vehicle-mounted navigation devices as examples of implementing the technical idea of the invention, they are in no way meant to limit the application of the invention to vehicle-mounted navigation devices; the invention is equally applicable to other embodiments within the scope of the appended claims, such as vehicle-mounted electronic appliances with no navigation capabilities like those in the vehicle-mounted navigation devices presented below as practical examples.

EXAMPLE 1

FIG. 1 is a block diagram showing the configuration of a principal part of a vehicle-mounted navigation device 1 according to Example 1.

A control portion 10 is built around a processor comprising a CPU (unillustrated), a RAM (unillustrated), and a ROM (unillustrated), and controls the operation of different parts of the vehicle-mounted navigation device 1 according to a control program stored in the RAM and ROM.

The control portion 10 also functions as a power supply control portion 100 for switching the supply of electric power in the vehicle-mounted navigation device 1, as an area discrimination portion 101, and as a sound indication control portion 102.

The area discrimination portion 101 and the sound indication control portion 102 will be described later.

A current location detection portion 11 is built around, for example, a GPS receiver; it receives radio waves containing time information from a plurality of GPS satellites orbiting in the sky around the Earth, and based on it calculates the current location.

The current location detection portion 11 can also calculate the current location by use of an autonomous navigation portion comprising a distance sensor, a direction (bearing) sensor, a rudder angle sensor, and the like In this case, by monitoring the traveling distance, traveling direction, and turning angle of the vehicle, and accumulating these values relative to a reference location, it is possible to determine the current location. This current location detection by the autonomous navigation portion, when combined with GPS reception, is useful in tunnels, where GPS radio waves do not reach, and in streets with tall buildings, where errors tend to occur.

An input portion 12 comprises keys, switches, and the like with various functions; it accepts operation on the vehicle-mounted navigation device 1 and entry of a departure location and a destination location.

A display portion 13 displays map images and guided route images for viewing by the user, and is built around a liquid crystal display or the like The display portion 13 may be configured to function as an input portion, in which case the user touches icons displayed on the screen to enter selections.

A map storage portion 14 stores the following data: a plurality of rectangular blocks of mesh data divided at predetermined latitudes and longitudes; and road data containing road node data and road link data, the road node data being the data of nodes, which are junction points such as cross roads and branch points of roads, the road link data being the data of links, which are paths connecting between nodes. The road node data contains road node numbers, location coordinates, numbers of connecting links, names of crossroads, etc; also stored are guide points, which correspond to guided locations such as crossroads, and guide data, which is for guiding a right turn, a left turn, straight traveling, etc.

On the other hand, the road link data contains road node numbers as start points and end points, road types, link lengths (link costs), times needed, numbers of lanes, lane widths, etc. The road link data further contains, as link attributes, the data of bridges, tunnels, railroad crossings, toll gates, etc. Road types are information distinguishing expressways and toll roads, and national roads and prefectural roads, etc.

The map storage portion 14 further stores background data containing water system data as to the shapes of coast lines, lakes and marshes, rivers, etc, administrative boundary data, and facility data containing the locations, shapes, and names of facilities.

When the user at a departure location specifies a destination location by use of the input portion 12, a route search portion 15 refers to the road data stored in the map storage portion 14 and searches for an optimum route from the departure location to the destination location.

In this search for an optimum route, the links and nodes leading from the current location or the user-specified departure location to the user-specified destination location are searched for by various methods such as Dijkstra's algorithm; the link lengths (link costs), the times needed, etc. are accumulated so that the route with the smallest total link length or the shortest time needed is taken as the guided route, and the road nodes and links belonging to this route are presented as guided route data.

A vehicle state detection portion 16 checks whether or not the vehicle is parked. Here, the vehicle is referred to as being "parked" when its engine is turned off In the practical example under discussion, the vehicle state detection portion 16 recognizes that the vehicle is parked on detecting that the vehicle's ignition switch is turned off.

A theft-prone area storage portion 17 has previously stored in it the data of areas where vehicles or vehicle-mounted navigation devices are prone to theft.

A sound indication portion 18 gives various kinds of sound indication in the vehicle-mounted navigation device 1, for example for indicating guidances during route guiding.

The area discrimination portion 101 is, as described above, a control function included in the control portion 10; it identifies where on the map data stored in the map storage portion 14 the vehicle's current location detected by the current location detection portion 11 falls, and it also compares the vehicle's current location with the data of theft-prone areas stored in the theft-prone area storage portion 17 to check whether or not the vehicle's current location falls within a theft-prone area.

The sound indication control portion 102 also is a control function included in the control portion 10; it controls various kinds of sound indication given by the sound indication portion 18. In the practical example under discussion, when the area discrimination portion 101 detects that the vehicle's current location falls within a theft-prone area, the sound indication control portion 102 instructs the sound indication portion 18 to indicate a warning to watch out for theft.

An external power supply connection portion 19 serves to connect the vehicle-mounted navigation device 1 to an external power supply (unillustrated). The vehicle-mounted navigation device 1 usually operates by receiving electric power from the external power supply. The external power supply is, for example, electric power supplied from a cigarette light port.

When the area discrimination portion 101 detects that the vehicle's current location falls within a theft-prone area, and in addition the vehicle state detection portion 16 detects that the vehicle is parked, while the sound indication portion 18 is indicating a warning, an internal power supply 20 supplies electric power to those parts of the vehicle-mounted navigation device 1 which are concerned with indicating the alarm. In other words, no electric power is supplied to those parts which does not need electric power during the indication of the warning, for example the current location detection portion 11, the route search portion 15, the vehicle state detection portion 16, etc.

Next, theft-prone area data will be described.

Figure 2:
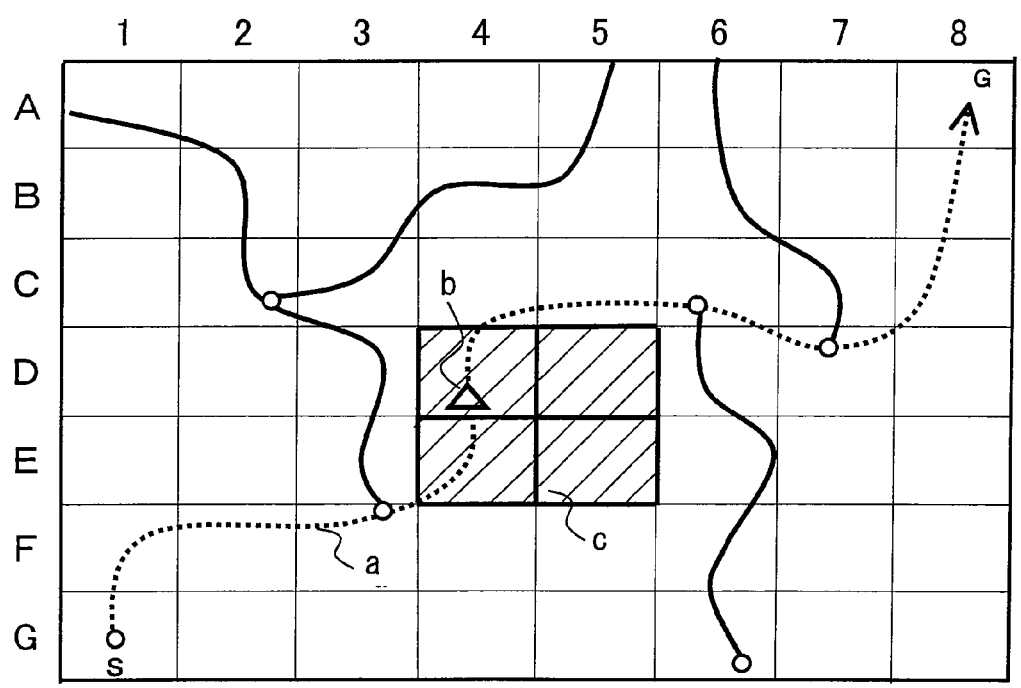
[FIG. 2] is a diagram showing a theft-prone area on a map.

FIG. 2 is a diagram showing a theft-prone area on the map data stored in the map storage portion 14.

In FIG. 2, the reference sign "a" indicates a guided route, the reference sign "b" indicates the current location of the vehicle, and the reference sign "c" indicates a theft-prone area.

As shown in FIG. 2, the map data stored in the map storage portion 14 is composed of a plurality of rectangular blocks of mesh data obtained by dividing an entire map at predetermined latitudes and longitudes, and each divided block of mesh data contains road node data, road link data, etc.

Moreover, in the practical example under discussion, each block of mesh data is identified by an alphabet letter combined with a number The theft-prone area in FIG. 2 corresponds to blocks D4, D5, E4, and E5 of mesh data, which are enclosed in thick lines.

Next, referring to FIG. 3, the area data stored in the theft-prone area storage portion 17 will be described.

As the data of theft-prone areas, whether or not the area corresponding to each block of mesh data stored in the map storage portion 14 is a theft-prone area is previously set, and stored in the theft-prone area storage portion 17. As shown in FIG. 3, for all the blocks of mesh data stored in the map storage portion 14, whether or not they correspond to a theft-prone area is set, and as described above, each block of mesh data is identified by an alphabet letter combined with a number.

Any block of mesh data corresponding to a theft-prone area in FIG. 3 is assigned "1" (D4, D5, E4, and E5); any block of mesh data corresponding to a non-theft-prone area is assigned "0." With these settings made, when it is detected that the location at which the vehicle is parked corresponds to road data or facility data contained in a block of mesh data assigned "1" as a theft-prone area, a warning is given.

The practical example described above deals with a case where, as the data of theft-prone areas, whether or not the area corresponding to each block of mesh data is a theft-prone area is set. Instead, theft-prone areas may be set not by units of data blocks but by administrative units.

FIG. 4 is a diagram showing the data of theft-prone areas set by administrative units, taking up Tottori Prefecture as an example.

The data in FIG. 4 is divided finely by prefectures, cities, towns, down to lots.

For each lot, whether or not it is a theft-prone area is set. In FIG. 4, Lots 1 and 2, AAA Town, Tottori City are assigned "1" as theft-prone areas. Likewise, Lots 1, 2, and 3, BBA Town, Kurayoshi City and Lot 1, BBB Town, Kurayoshi City also are assigned "1" as theft-prone areas. The other areas are assigned "0" as non-theft-prone areas.

Although in the practical example under discussion, whether or not an area is a theft-prone area is set for each lot in each town, this is not meant as any limitation; it may be set city by city, or town by town.

Next, referring to the flow chart in FIG. 5, the control operation of the control portion 10 in a vehicle-mounted navigation device according to the invention will be described.

When the current location detection portion 11 detects the current location of the vehicle (step S1), then the area discrimination portion 101 compares the current location of the vehicle detected at step S1 with the data of theft-prone areas stored in the theft-prone area storage portion 17, and checks whether or not the vehicle's current location falls within a theft-prone area (step S2).

It is here assumed that the current location detection portion 11 constantly monitors the current location of the vehicle so long as it is traveling, irrespective of during route guiding or not.

If the check at step S2 finds that the vehicle's current location falls within a theft-prone area ("Y" at step S2), then the control portion 10 instructs the vehicle state detection portion 16 to check whether or not the vehicle's ignition switch has been turned off (step S3). If the vehicle state detection portion 16 detects that the vehicle's ignition switch has been turned off ("Y" at step S3), the power supply control portion 100 switches the source of the supply of electric power from the external power supply to the internal power supply (step S4). Thus, even after the ignition switch is turned off, the vehicle-mounted navigation device 1 continues operating.

After the source of electric power is switched from the external to the internal power supply at step S4, then the sound indication control portion 102 instructs the sound indication portion 18 to warn the user that the location at which the vehicle is currently parked is a theft-prone area; in response to the instruction, the sound indication portion 18 sounds a warning message like "you are currently in a theft-prone area; it would be better to move the vehicle," or "you are currently in a theft-prone area; it would be better to remove the vehicle-mounted navigation device" (step S5). At this time, simultaneously that the sound indication portion 18 gives the warning by sound, a warning message may be displayed on the display portion 13.

The practical example under discussion deals with a warning against the theft of the vehicle and a warning against the theft of the vehicle-mounted navigation device; here, needless to say, when a warning against the theft of the vehicle is given, the area data stored in the theft-prone area storage portion 17 is data related to areas where vehicles are prone to theft and, when a warning against the theft of the vehicle-mounted navigation device is given, the area data stored in the theft-prone area storage portion 17 is data related to areas where vehicle-mounted navigation devices are prone to theft.

If the check at step S3 finds that the vehicle's ignition switch remains on ("N" at step S3), a return is made to step S1, where the current location detection portion 11 resumes its detection.

If the check at step S6 finds that the warning has been completed ("Y" at step S6), the power supply control portion 100 turns the vehicle-mounted navigation device 1 off (step S7). If the check at step S6 finds that the warning has not been completed ("N" at step S6), indication is continued until the warning is completed.

If the check at step S2 finds that the current location does not fall within a theft-prone area ("N" at step S2), an advance is made to step S8, where the vehicle state detection portion 16 checks whether or not the vehicle's ignition switch has been turned off. If it is detected that the ignition switch has been turned off ("Y" at S8), an advance is made to step S7, where the vehicle-mounted navigation device 1 is turned off. If the check at step S8 finds that the vehicle's ignition switch remains on ("N" at step S8), a return is made to step S1, where the current location detection portion 11 resumes its detection.

EXAMPLE 2

Example 1 described above is an example where the data of theft-prone areas is previously set and stored in the theft-prone area storage portion 17. Example 2 described below is an example where the user himself can set theft-prone areas.

Figure 6:
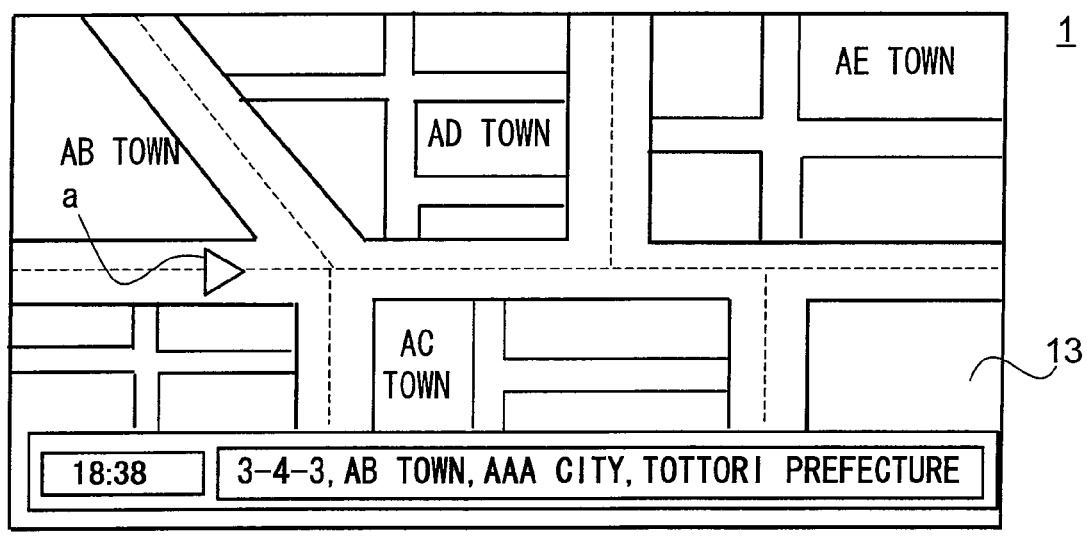
[FIG. 6] shows a map image displayed on the display portion 13 of the vehicle-mounted navigation device 1.

FIG. 6 is a diagram showing a map image displayed on the display portion 13.

In FIG. 6, the reference sign "a" indicates the current location of the vehicle. This map screen shows a map image that is used also during route guiding. As an unillustrated scale adjustment key is operated, the scale of the map can be adjusted freely to that of a wider-area or more detailed map.

Figure 7:
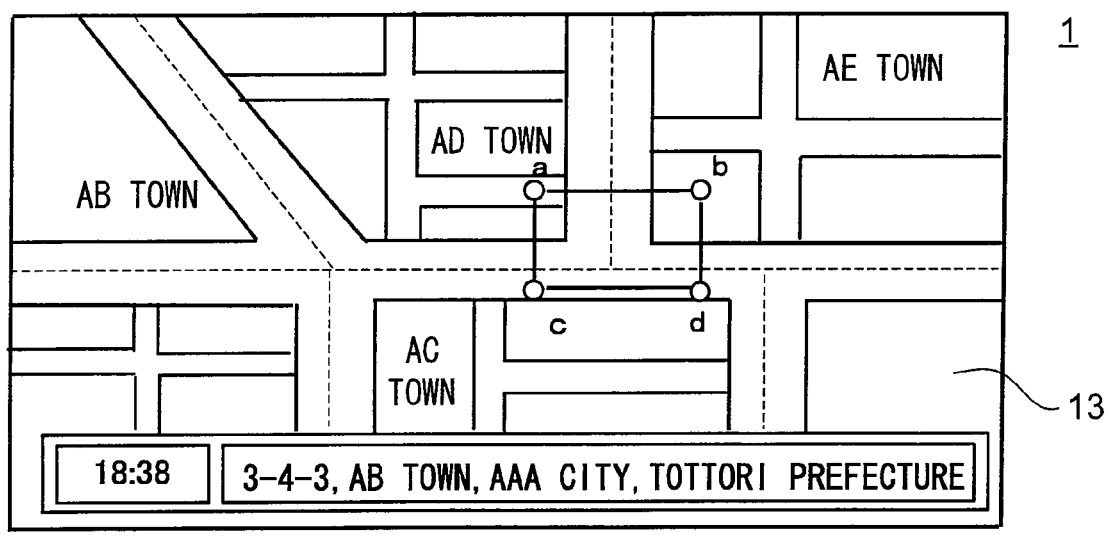
[FIG. 7] is a diagram showing a theft-prone area setting screen.

FIG. 7 shows a setting screen on which the user sets a theft-prone area.

For the user to set a theft-prone area, he first needs to switch the screen displayed on the display portion 13 to a theft-prone area setting screen. For switching to the theft-prone area setting screen, for example, a theft-prone area setting screen switching button or the like is provided in the input portion 12 of the vehicle-mounted navigation device 1, and when this button is pressed, the theft-prone area setting screen is displayed on the display portion 13. In the theft-prone area setting screen, the same map image as that described with reference to FIG. 6 is displayed. Whereas, however, the map image shown in FIG. 6 simply shows an map on the display portion 13, the map image as the theft-prone area setting screen shown in FIG. 7 is so configured that the user can directly specify a theft-prone area by touching the displayed map image.

To specify a theft-prone area, the user specifies an area that he wants to set as one by the coordinates of four points defining it. In FIG. 7, the coordinates of four points "a," "b," "c," and "d" are specified, and the area surrounded by these four points is set as a theft-prone area. The theft-prone area thus specified may be stored in a rewritable storage portion provided separately from the theft-prone area storage portion 17 in Example 1, or may be stored in a rewritable storage region provided within the theft-prone area storage portion 17.

As another possible method for the user to set a theft-prone area than the above-described one relaying on the user specifying the coordinates of four points by directly touching the map image, it is also possible to display a list of a plurality of areas on the display portion 13 and let the user select a desired area from those on the displayed list.

Figure 8:
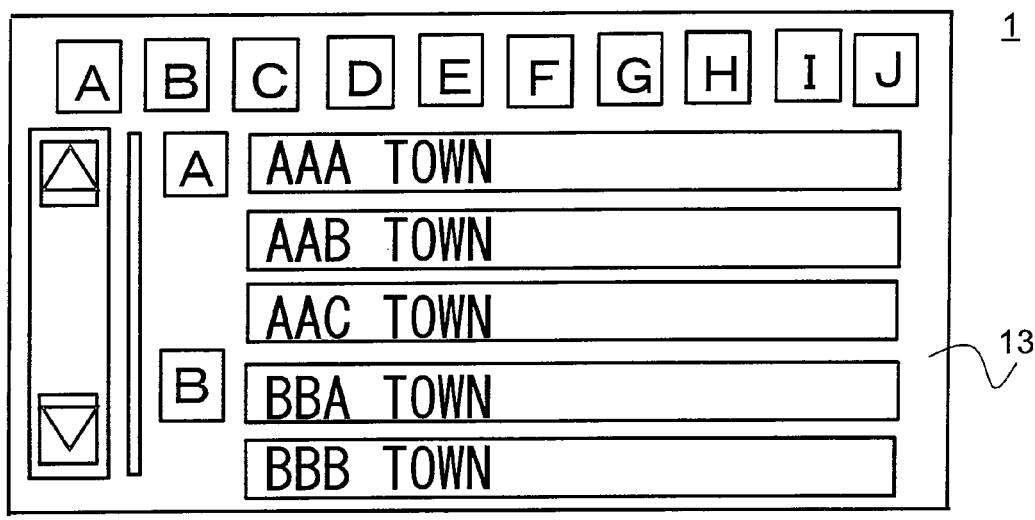
[FIG. 8] is a diagram showing a theft-prone area setting screen.

FIG. 8 is a diagram showing a selection screen for selecting a theft-prone area from areas on a list displayed on the display portion 13.

In FIG. 8, in a top part of the display portion 13, a plurality of horizontally arranged alphabet letters are shown. This is not meant as a limitation to a particular kind of alphabet, but is merely to present an example in illustration of the practical example under discussion; thus, instead of alphabet letters, Japanese kana characters may be shown in the order of the syllabary.

First, the user selects from the alphabet letters appearing in the top part of the display portion 13 the capital letter of the area that he wants to set as a theft-prone area. In FIG. 8, it is assumed that the user has selected "A." When the user selects the capital letter, a list of the areas with the selected capital letter is displayed. In FIG. 8, there are three hits (AAA Town, AAB Town, and AAC Town). By selecting a desired area from those on the displayed list, the user can set as a theft-prone area the area that he wants to set as one.

As another possible method different from those adopted in Examples 1 and 2 described above, it is also possible to receive the data of theft-prone areas by communication or the like from an organ, such as a police station, possessing such data and automatically add or update the data of theft-prone areas by use of the received data. In that case, the vehicle-mounted navigation device 1 needs to be additionally provided with a communication portion which communicates with the outside.

In Examples 1 and 2 described above, the vehicle state detection portion 16 judges that the vehicle is parked when it recognizes that the vehicle's ignition switch is turned from on to off. As another method, it s also possible to judge that the vehicle is parked, or that the vehicle is about to be parked, for example, when the vehicle's current location detected by the GPS receiver remains constant longer than a predetermined length of time, or when the vehicle's current location coincides with one of the locations, such as parking lots, contained in POI data at which the vehicle can be parked.

As described in detail above, a vehicle-mounted electronic appliance according to the invention can prevent theft of a vehicle or of the vehicle-mounted electronic appliance by giving the driver a warning to watch out for theft when the vehicle's current location falls within a theft-prone area.

Figure 5:
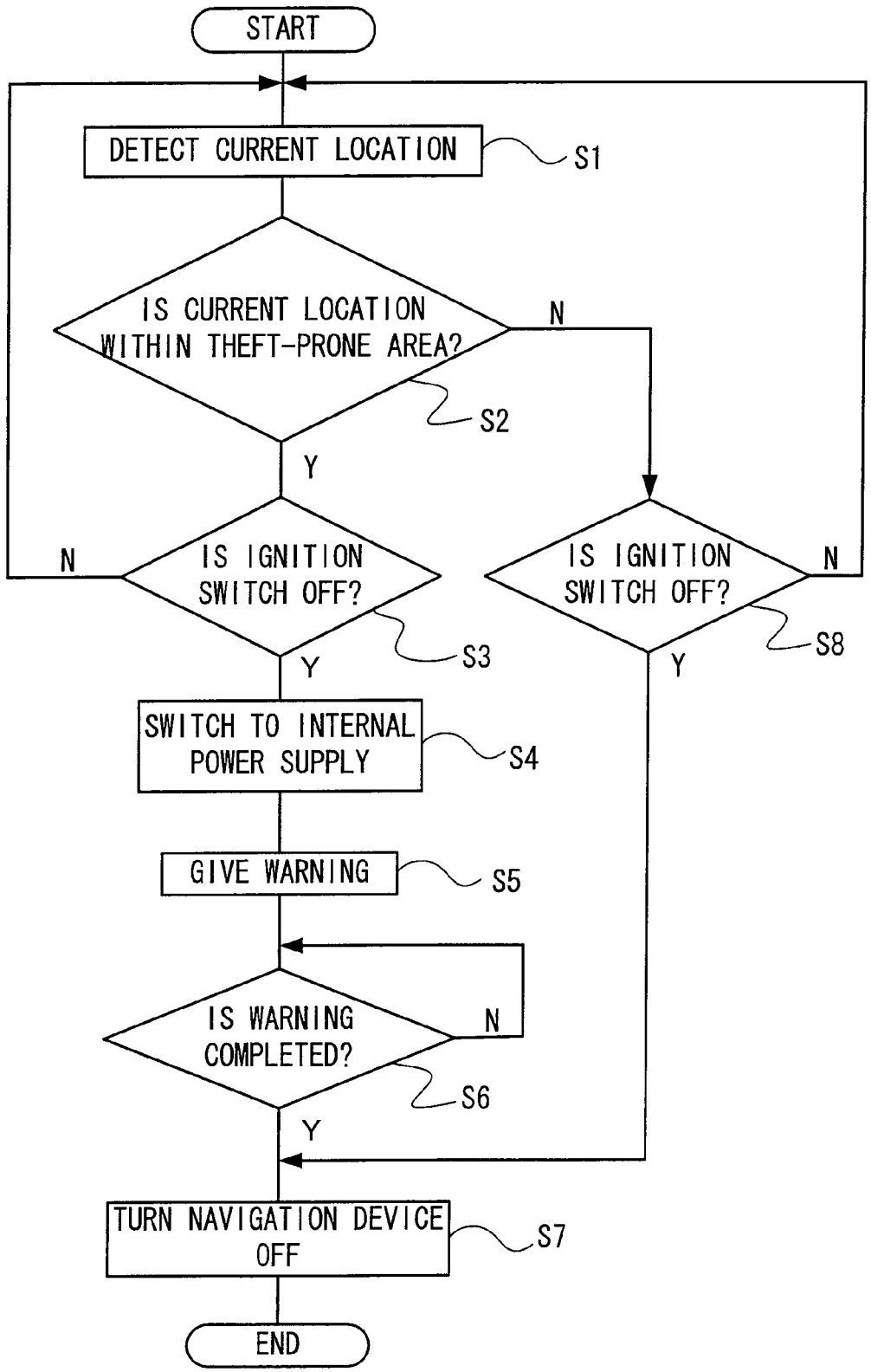
[FIG. 5] is a flow chart showing the control operation of a control portion in a vehicle-mounted navigation device 1 according to the invention.

Steps S1, S2, and S8 in FIG. 5 may be omitted so that step S3 is performed immediately at the start of the procedure in the flow chart. This makes it possible, whenever the vehicle state detection portion 16 detects that the vehicle is parked, irrespective of the area where it is parked, to indicate a warning to watch out for theft. That is, since theft can occur even in a non-theft-prone area, it is possible to prevent theft by indicating a warning to watch out for theft even when the location at which the vehicle is parked is in a non-theft-prone area.

As mentioned at the outset of the "Best Mode for Carrying Out the Invention" section of the present specification, the application of the present invention is not limited to vehicle-mounted navigation devices like those described as practical examples above; the invention is applicable to other electronic appliances equipped with a function of detecting the current location of a vehicle, the data of theft-prone areas, a function of detecting the vehicle being parked, a discrimination function of discriminating the current location of the vehicle, and a function of giving a warning.

Industrial Applicability

The present invention finds application in various kinds of vehicle-mounted electronic appliances such as navigation devices, music players, DVD players, and television receivers ready for analog and digital broadcasts.

The invention claimed is:

1. A vehicle-mounted electronic appliance having a vehicle state detection portion detecting a vehicle being parked, a sound indication portion, a sound indication control portion, and a current location detection portion detecting a current location, characterized in that the vehicle-mounted electronic appliance further has an external power supply connection portion, an internal power supply, and a power supply control portion, and receives electric power from the external power supply via the external power supply connection portion, the vehicle-mounted electronic appliance further has a theft-prone area storage portion storing theft-prone area data, and an area discrimination portion, and when the area discrimination portion detects that the current location detected by the current location detection portion is within a theft-prone area stored in the theft-prone area storage portion, and in addition the vehicle state detection portion detects that the vehicle is parked, the sound indication control portion makes the sound indication portion indicate a warning to watch out for theft, and the power supply control portion switches source of supply of electric power from the external power supply to the internal power supply.

2. The vehicle-mounted electronic appliance according to claim 1, characterized in that the vehicle state detection portion judges that the vehicle is parked on detecting that an ignition switch of the vehicle is turned from on to off.

3. The vehicle-mounted electronic appliance according to claim 1, characterized in that the vehicle state detection portion judges that the vehicle is parked on detecting that an ignition switch of the vehicle is turned from on to off.

* * * * *